US011972600B2

(12) United States Patent
Kiefer et al.

(10) Patent No.: US 11,972,600 B2
(45) Date of Patent: Apr. 30, 2024

(54) METHOD AND APPARATUS FOR IDENTIFYING AN ARTICLE

(71) Applicant: TRUMPF Werkzeugmaschinen GmbH + Co. KG, Ditzingen (DE)

(72) Inventors: Manuel Kiefer, Sinsheim (DE); Willi Poenitz, Leonberg (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 0 days.

(21) Appl. No.: 17/197,070

(22) PCT Filed: Sep. 3, 2019

(86) PCT No.: PCT/EP2019/073383
§ 371 (c)(1),
(2) Date: Jun. 26, 2023

(87) PCT Pub. No.: WO2020/053023
PCT Pub. Date: Mar. 19, 2020

(65) Prior Publication Data
US 2023/0118305 A1    Apr. 20, 2023

(30) Foreign Application Priority Data
Sep. 12, 2018 (DE) .................... 10 2018 215 538.0

(51) Int. Cl.
*G06V 10/75*    (2022.01)
*G06T 7/00*    (2017.01)
*G06V 10/77*    (2022.01)

(52) U.S. Cl.
CPC ............ *G06V 10/758* (2022.01); *G06T 7/001* (2013.01); *G06V 10/7715* (2022.01); *G06T 2207/30136* (2013.01); *G06V 2201/06* (2022.01)

(58) Field of Classification Search
CPC ............ G06V 10/7715; G06V 2201/06; G06T 7/001; G06T 2207/30136
See application file for complete search history.

(56) References Cited

U.S. PATENT DOCUMENTS 6,836,567 B1 * 12/2004 Silver ................ G06V 10/7515
382/199
6,856,698 B1 * 2/2005 Silver .................. G06V 10/752
382/199

(Continued)

FOREIGN PATENT DOCUMENTS

DE    202009005329 U1    7/2009
DE    102015103022 A1    8/2016

(Continued)

OTHER PUBLICATIONS

Bozma, et al., "Visual Processing and Classification of Items on a Moving Conveyor: a Selective Perception Approach," *Robotics and Computer Integrated Manufacturing* 18, 2, 125-133, Apr. 2002, Elsevier Science Publishers B.V. Barking, Great Britain.

(Continued)

*Primary Examiner* — Samir A Ahmed
(74) *Attorney, Agent, or Firm* — LEYDIG, VOIT & MAYER, LTD.

(57) ABSTRACT

The invention relates to a method and an apparatus (10) for recognizing an article. This involves at least one shot (14), in particular in the form of a photograph, of the article being produced. The shot (14) is used to ascertain shot features (22) by means of a shot extraction algorithm (20). Stored article data (12) are used to ascertain article features (28) and to compare them with the shot features (22) in order to output association information (36). There is in particular provision according to the invention for a user rating (42) to be provided to improve both the shot extraction algorithm (20) and the article extraction algorithm (26). Alternatively (Continued)

or additionally, there is in particular provision according to the invention for both the shot extraction algorithm (20) and the article extraction algorithm (26) to be produced on the basis of interconnected, preferably weighted, data aggregation routines.

17 Claims, 1 Drawing Sheet

(56) References Cited

U.S. PATENT DOCUMENTS

| | | | | |
|---|---|---|---|---|
| 9,619,877 | B2* | 4/2017 | Minato | G06T 7/12 |
| 10,249,033 | B1* | 4/2019 | Taheri | G06F 3/0482 |
| 2009/0281975 | A1* | 11/2009 | Atallah | G06F 16/50 |
| | | | | 706/18 |
| 2012/0296900 | A1* | 11/2012 | Kalai | G06Q 10/00 |
| | | | | 707/E17.019 |
| 2016/0121482 | A1* | 5/2016 | Bostick | B25J 9/16 |
| | | | | 901/1 |
| 2016/0224858 | A1 | 8/2016 | Chen | |
| 2017/0115656 | A1* | 4/2017 | Ottnad | B23K 26/1464 |
| 2019/0066493 | A1* | 2/2019 | Sohn | G06V 20/20 |

FOREIGN PATENT DOCUMENTS

| | | |
|---|---|---|
| JP | H0793545 A | 4/1995 |
| JP | H11320143 A | 11/1999 |
| JP | 2017183390 A | 10/2017 |

OTHER PUBLICATIONS

Ghazal, et al., "Archival and Retrieval of Lost Objects Using Multi-Feature Image Matching in Mobile Applications," *International Journal of Computing and Digital Systems* 5, Jan. 1, 2016, 73-83, University of Bahrain, Sakhir, Kingdom of Bahrain.

Malamas, et al., "A Survey on Industrial Vision Systems, Applications and Tools," *Image and Vision Computing* 21, 2, 171-188, Feb. 2003, Oregon State University School of Electrical Engineering and Computer Science, Corvallis, Oregon, USA.

Thomas, et al., "Real-Time Industrial Visual Inspection: A Review," *Real-Time Imaging*, 1, 2 139-158, Jun. 1995, Academic Press Limited, Cambridge, USA.

Ahn, et al., "reCAPTCHA," online article, *Wikipedia*, Sep. 1-9, 2018, The Wikimedia Foundation, San Francisco, USA.

* cited by examiner

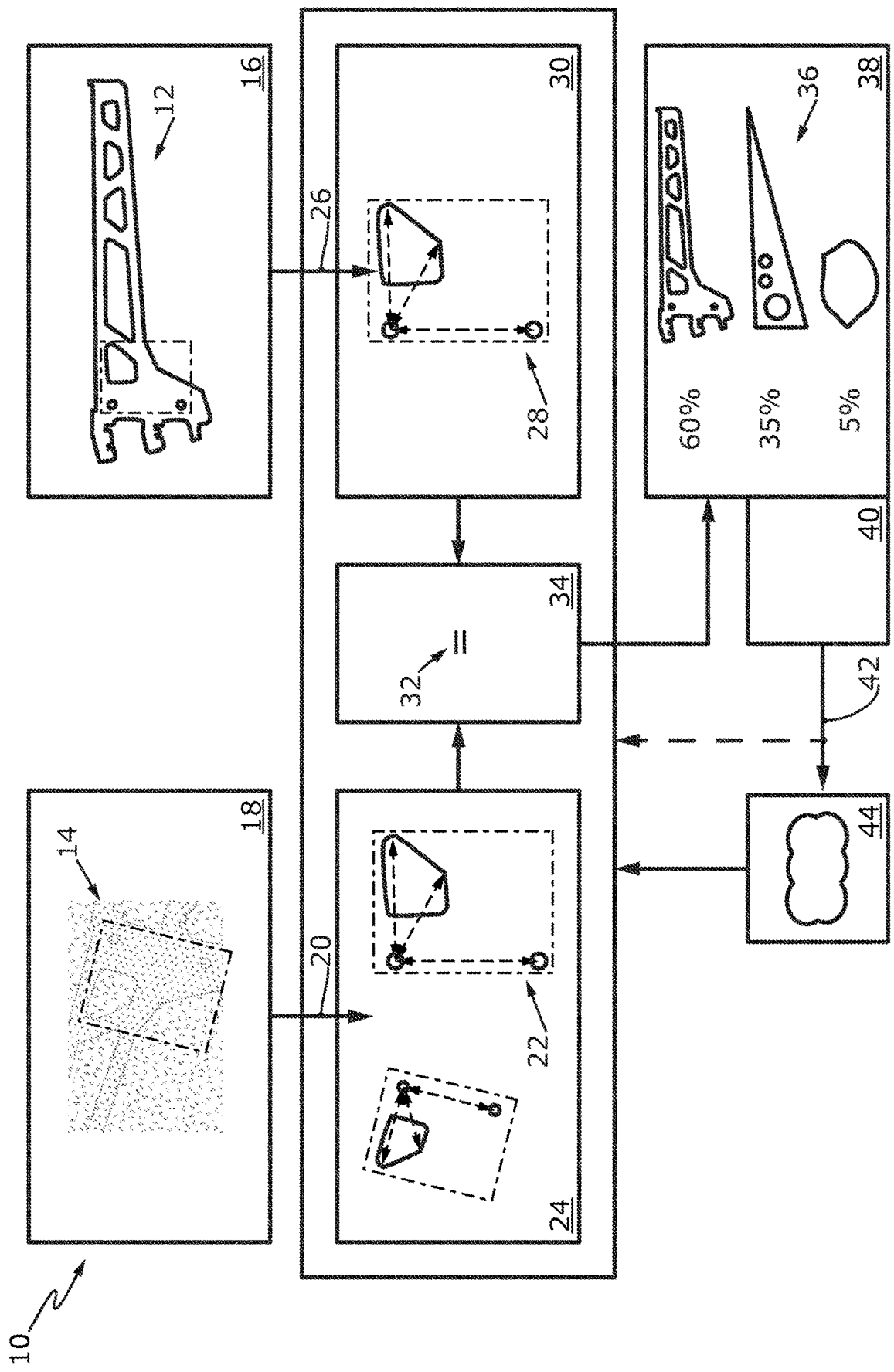

METHOD AND APPARATUS FOR IDENTIFYING AN ARTICLE

BACKGROUND OF THE INVENTION

The invention relates to a method and an apparatus for identifying an article. The invention also relates to the use of such a method or the use of such an apparatus in an industrial production.

In the manufacture of articles, in particular in the manufacture of sheet metal parts, an article, in particular a manufactured sheet metal part, is often found that cannot be associated with a specific order. Disposing of the article is a waste of resources and also harbors the risk of the article being missing from a particular order. However, the completely manual identification of the article is time-consuming and can often only be carried out successfully by experienced employees who are not always present or who have to be released from other tasks to identify the article. Completely automatic identification of an article, in contrast, often fails due to insufficient image capture of the article or inadequate identification programs.

OBJECT OF THE INVENTION

It is therefore the object of the invention to provide a method and an apparatus that allows an effective association of a randomly found article. A further object of the invention is to provide a corresponding use of the method or the apparatus.

DESCRIPTION OF THE INVENTION

This object is achieved according to the invention by a method according to patent claim 1, an apparatus according to patent claim 12 or a use according to patent claim 16. The subclaims represent preferred further developments.

The invention thus relates to a method for identifying an article. The article can be designed in the form of an essentially two-dimensional article, for example in the form of a flat sheet metal part, or in the form of a three-dimensional article, for example in the form of a sheet metal part having deformations. The identification takes place by associating an image of the article with stored article data. These article data can be stored in the form of CAD data. The method has the following method steps:
  A) creating the image or images of the article using an image capturing device, wherein the image capturing device can be designed in the form of a camera;
  B) deriving image features from the image based on an image extraction algorithm;
  C) deriving article features from the stored article data based on an article extraction algorithm;
  D) comparing the image features to the article features based on a comparison algorithm; and
  E) output of association information of the image with the stored article data.

According to the invention, it is thus provided to output at least one piece of information relating to the association of the article to be identified with stored article data. The information is preferably specified in the form of probability information, so that it can be seen with what probability the article corresponds to the stored article data. The output can take place, for example, on a screen, data glasses or as data transfer. Advantageously, a plurality of pieces of association information can be output with an indication of the probability.

According to the invention, features are extracted from the image as well as from the stored article data. This allows a particularly reliable association of the image with the stored article data and thus a particularly high probability of identifying the article.

The method preferably has the following method step:
  F) reading out a user rating of the association information.

The method then provides for reading an evaluation of a user with regard to this association information. The evaluation by the user can take place, for example, by data transmission or by an input device such as a button, touchscreen, voice recording, speech recognition or similar input devices. If, for example, two or more identification hits are displayed to the user, sorted according to probability, then the user can select the one which in his opinion really matches. He has thus given a user rating. This can make it possible to improve association information that will be output in the future.

An image extraction algorithm can read in data from the image, process it depending on predetermined image parameters and output image features in the form of the processed data. The predetermined image parameters can have so-called weighted variables. Their function and ascertainment are explained below.

The method can further preferably have the following method step:
  H) changing, in particular improving, in particular optimizing, parameters of the image extraction algorithm, the article extraction algorithm and/or the comparison algorithm on the basis of the user rating.

The parameters can have so-called weighted variables. Their ascertainment and function are explained below.

The following method step is preferably carried out before, during and/or after method step H):
  G) storing the user rating of the association information in a user rating results memory.

Saving the user rating allows a large number of user ratings to be collected, as a result of which the image extraction algorithm, the article extraction algorithm and/or the comparison algorithm can be significantly improved.

The user rating results memory can be cloud-based. Cloud-based here means an, in particular remotely located, preferably anonymized, storage device in which user ratings from more than one, advantageously from several hundred or several thousand different users, are stored. In this way, different users can contribute to the optimization of the method regardless of the manufacturing location. It has been recognized that the described method does not achieve resounding successes; that is to say, association information having the correct association with the highest probability is received only when several tens of thousands, in particular several hundred thousand, user ratings have been read out. Such a volume of data is often not achievable in a year for a single production facility. Accordingly, the method would probably have presumably remained uninteresting.

The image can be created or captured in the wavelength range that is visible to the human eye. As an alternative or in addition to this, the image can be made in the wavelength range that is not visible to the human eye, for example in the IR range, in the UV range and/or in the ultrasound range.

In method step A), a plurality of images of the article can be captured with the image capturing device. In method step B), the image features can be extracted from a plurality of images. In method step E), association information with the stored articles from a plurality of images can be output. It has been shown that the creation and processing of a plurality of images significantly improves the quality of the association information for a user, since in particular the influence of artifacts caused by the image position is reduced.

The image extraction algorithm, the article extraction algorithm and/or the comparison algorithm preferably has/have an algorithm with a plurality of data aggregation routines. A data aggregation routine can be designed to aggregate a plurality of "ascertained data" into a new data packet. The new data packet can have one or more numbers or vectors. The new data packet can be made available in full or in part to further data aggregation routines as "ascertained data." "Ascertained data" can be, for example, image data, article data or data packets made available by one of the data aggregation routines. Particularly preferably, the image extraction algorithm, the article extraction algorithm and/or the comparison algorithm is/are designed in the form of an algorithm having a plurality of connected data aggregation routines. In particular, several hundred, in particular several thousand, such data aggregation routines can be interconnected. This significantly improves the quality and speed of the algorithm(s). The image extraction algorithm, the article extraction algorithm and/or the comparison algorithm can have a function with weighted variables. One, in particular a plurality of, particularly preferably all, data aggregation routines can be designed to combine a plurality of "ascertained data" in each case with a weighted variable, in particular to multiply and, thus, convert the "ascertained data" into "combined data" then to aggregate, in particular add, the "combined data" into a new data packet. The change in weighting, in particular the change in the weighted variables, is particularly preferably carried out on the basis of the user rating. In order to ascertain suitable weighted variables, the image extraction algorithm, the article extraction algorithm and/or the comparison algorithm can be run through with data, in particular image data and/or article data whose association is known in each case. The weighted variables can be determined, preferably in a first phase, separately for the image extraction algorithm, the article extraction algorithm and the comparison algorithm.

The image features and article features can themselves be data packets, in particular a plurality of structured data, in particular data vectors or data arrays, which themselves may again represent "ascertained data," e.g. for the comparison algorithm, in particular for the data aggregation routines of the comparison algorithm. The exact structure of these image features and article features can change, in particular improve, preferably be optimized, via the automated evaluation of the user rating.

Since the weighted variables, which are changed, in particular improved, preferably optimized by the user rating of a first user or a first group of users, are managed in a cloud-based manner, other users can also use them in their algorithms and benefit from the method.

The aforementioned algorithms or a further secondary or superordinate algorithm can be designed to monitor and recognize when any or all of the algorithms output association information with a predefined accumulation that is rated as poor by the user and then output a negative indication. The output can be visual, for example on a screen, or in another suitable form, for example as data output. The monitoring algorithm can also be designed to react to the output of such a negative indication with an improvement routine that changes further properties or the interaction of one or more of the aforementioned algorithms.

In a further preferred embodiment of the method, the article features are available in the form of design data, material data, surface quality data and/or thermal conductivity data.

The comparison algorithm may comprise the formation of a scalar product and/or the formation of a difference between the image features and the article features. The aforementioned measures have proven to be particularly effective in associating the image features with the article features.

Furthermore, the outputting of the association information of the image preferably includes the output of a plurality of probabilities of association with different stored articles. A user can thus choose from various association options. The identification of the article can therefore be carried out with a very high probability of success.

The object according to the invention is also achieved by an apparatus for identifying an article by associating the article with stored article data, the apparatus having the following:
a) an image capturing device for creating an image of the article;
b) an image extraction unit having an image extraction algorithm for extracting image features from the image;
c) an article extraction unit having an article extraction algorithm for extracting article features from the stored article data;
d) a comparison unit having a comparison algorithm for comparing the image features to the article features;
wherein the image extraction algorithm, the article extraction algorithm and/or the comparison algorithm can be optimized on the basis of the user rating; and
e) an output unit for outputting association information of the image created using the image capturing device with the stored article data.

The apparatus according to the invention is preferably designed to carry out a method described here.

The image capturing device can be designed in the form of a camera, in particular for visible light.

The apparatus can furthermore have the following:
f) an input unit for reading out a user rating with regard to the association information.

Furthermore, the apparatus can have the following:
g) a user rating results memory for storing the user rating of the association information. The user rating results memory can be cloud-based.

The image extraction algorithm, the article extraction algorithm and/or the comparison algorithm can be designed in the form of an algorithm having a plurality of connected data aggregation routines.

The method and/or the apparatus can be used particularly advantageously in industrial production with a computer-based production control for processing reflective articles, in particular sheet metal parts. In the past, the images of sheet metal parts captured with an image capturing device were often of insufficient quality for identification, because contours can only be distinguished from the background with great difficulty and light reflections simulate false contours. For this reason, methods and apparatuses that compare image data to article data without the described algorithms have so far not led to any success in industrial production. The term "reflective articles" is intended to mean articles having a smooth surface which reflect the light in such a way that when the image is captured, in addition to the contours, undesired light reflections from other articles can also occur. Examples of such reflective articles are metals, glass, plastics having a smooth surface, coated materials such as coated plates made of plastics, wood, metal, glass, etc.

It is particularly advantageous if the production control is at least partially cloud-based. Parameters, in particular the weighted variables, can then be used for changing, in particular improving, in particular optimizing, the algorithms from a first production facility in other production facilities and vice versa. There is a much larger database available and the identification for each individual production facility can be significantly improved.

Further advantages of the invention result from the description and the drawings. Likewise, according to the invention, the aforementioned features and those which are to be explained below can each be used individually for themselves or for a plurality of combinations of any kind. The embodiment shown and described is not to be understood as exhaustive but rather has an exemplary character for the description of the invention.

DETAILED DESCRIPTION OF THE INVENTION AND DRAWING

FIG. 1 shows a schematic representation of an embodiment of the method according to the invention or of the apparatus according to the invention.

FIG. 1 shows an apparatus 10 for identifying an article that has been found without being associated. The article can be designed in the form of a sheet metal part. Article data 12 are stored for the article. In order to associate the found article with the article data 12 and thereby identify it, at least one image 14 is created.

The article data 12 are preferably stored in the form of CAD data, in particular in an article database 16 in the form of a CAD database.

The image 14 is created with an image capturing device 18. The image capturing device 18 can be designed in the form of a camera.

The image 14 shown in FIG. 1 indicates that the association of such an image 14 can be very difficult. This is especially true if—as shown—the image 14 shows only part of the article, the image 14 is made against an unsettled background and/or the surface properties of the article make it difficult to create the image 14.

An image extraction algorithm 20 is applied to image 14 in order to extract image features 22. This is indicated schematically in FIG. 1 with the aid of the region in the image 14 framed by dash-dotted lines. The image extraction algorithm 20 is stored in an image extraction unit 24. The image extraction algorithm 20 can have data aggregation routines that are interconnected, in particular weighted relative to one another.

An article extraction algorithm 26 is applied to the article data 12 in order to extract article features 28. This is indicated schematically in FIG. 1 with the aid of the region framed by dash-dotted lines in the article data 12. The article extraction algorithm 26 is stored in an article extraction unit 30. The article extraction algorithm 26 can have data aggregation routines that are interconnected, in particular weighted relative to one another.

The image features 22 and the article features 28 are fed to a comparison algorithm 32. The comparison algorithm 32 is stored in a comparison unit 34. The comparison algorithm 32 can have data aggregation routines that are interconnected, in particular weighted relative to one another. The comparison algorithm 32 is preferably designed to form a scalar product or a difference between the image features 22 and the article features 28.

As a result of the comparison algorithm 32, association information 36 is output. The association information is output in an output unit 38. As shown in FIG. 1, a plurality of article data (in this case three; not denoted by a reference symbol in FIG. 1) can be displayed, with the association probability (here 60%, 35% and 5%) being output for the respective article data. This makes it considerably easier for a user to associate the article found with article data.

In order to improve future associations, i.e. to increase the quality of future association information, the apparatus 10 has an input unit 40. The input unit 40 is designed to read out a user rating 42. The user rating 42 is then used to optimize the image extraction algorithm 20, the article extraction algorithm 26 and/or the comparison algorithm 32 or the parameters thereof.

The user rating 42 can be stored in a user rating results memory 44, so that the method or the apparatus 10 can be optimized with a large number of user ratings 42. Particularly preferably, the user rating results memory 44 is cloud-based. As a result, user ratings 42 across devices can flow into the optimization of the method or the apparatus 10.

In other words, the invention relates to a method and an apparatus 10 for recognizing an article. At least one image 14, in particular in the form of a photograph, of the article is created. Based on the image 14, image features 22 are ascertained by means of an image extraction algorithm 20. On the basis of stored article data 12, article features 28 are ascertained and compared to the image features 22 in order to output association information 36. According to the invention, provision is made in particular to provide a user rating 42 both to improve the image extraction algorithm 20 and the article extraction algorithm 26. As an alternative or in addition to this, it is provided according to the invention in particular that both the image extraction algorithm 20 and the article extraction algorithm 26 are based on interconnected, preferably weighted, data aggregation routines.

LIST OF REFERENCE NUMERALS 10 apparatus
12 article data
14 image
16 article database
18 image capturing device
20 image extraction algorithm
22 image features
24 image extraction unit
26 article extraction algorithm
28 article features
30 article extraction unit
32 comparison algorithm
34 comparison unit
36 association information
38 output unit
40 input unit
42 user rating
44 user rating results memory

The invention claimed is:

1. A computer-implemented method for automatically identifying an article by associating an image of the article with stored article data, the method comprising:
    A) creating the image of the article;
    B) extracting image features from the image using a first plurality of interconnected data aggregation routines;
    C) extracting article features of a plurality of stored articles from the stored article data using a second plurality of interconnected data aggregation routines;
    wherein the method step C) are configured to be carried out before, during, or after method steps A) and B), and wherein the following method steps are then carried out:

D) comparing the image features to the article features using a third plurality of interconnected data aggregation routines; and E) outputting association information of the article with one or more stored articles of the plurality of stored articles based on the comparison of the image features to the article features;

wherein each data aggregation routine is configured to aggregate a plurality of ascertained data into a new data packet using a function with weighted variables, wherein the ascertained data comprise image data, article data, or data packets made available by one of the data aggregation routines.

2. The method according to claim 1 comprising the further method step:

F) reading a user rating of the association information.

3. The method according to claim 2, comprising the further method step:

H) optimizing the weighted variables of the first plurality of interconnected data aggregation routines, the second plurality of interconnected data aggregation routines, and the third plurality of interconnected data aggregation routines based on the user rating.

4. The method according to claim 3, wherein the following method step is carried out before, during, or after method step H):

G) storing the user rating of the association information in a user rating results memory.

5. The method according to claim 4, wherein the user rating results memory is cloud-based.

6. The method according to claim 1, wherein the image is produced in the wavelength range visible to the human eye.

7. The method according to claim 1, wherein:

in method step A) a plurality of images of the article is captured; and in method step B) the image features are extracted from the plurality of images.

8. The method according to claim 1, wherein the function used in each data aggregation routine comprises a summation of a plurality of terms, each term being a respective ascertained datum multiplied by a respective weighted variable.

9. The method according to claim 2, wherein the article features are present in the form of design data, material data, surface quality data, or thermal conductivity data.

10. The method according to claim 2, wherein comparing the image features to the article features comprises forming a scalar product or a difference between the image features and the article features.

11. The method according to claim 1, wherein the association information comprises probabilities of the article being associated with the one or more stored articles.

12. An apparatus for identifying an article by associating an image of the article with stored article data, the apparatus comprising:

a) an image capturing device for capturing the image of the article;

b) an image extractor configured to extract image features from the image using a first plurality of interconnected data aggregation routines;

c) an article extractor configured to extract article features of a plurality of stored articles from the stored article data using a second plurality of interconnected data aggregation routines; and d) a comparator configured to compare the image features to the article features using a third plurality of interconnected data aggregation routines;

wherein each data aggregation routine is configured to aggregate a plurality of ascertained data into a new data packet using a function with weighted variables, wherein the ascertained data comprise image data, article data, or data packets made available by one of the data aggregation routines, and wherein the weighted variables of the extractor, of the article extractor, and of the comparator are optimizable on a basis of a user rating; and wherein the apparatus is configured to output association information of the article with one or more stored articles of the plurality of stored articles, the association information being created based on the comparison of the image features to the article features.

13. The apparatus according to claim 12, wherein the apparatus is further configured to:

f) read a user rating of the association information.

14. The apparatus according to claim 13, wherein the apparatus further comprises:

g) a user rating results memory for storing the user rating of the association information.

15. The apparatus according to claim 12, wherein the function used in each data aggregation routine comprises a summation of a plurality of terms, each term being a respective ascertained datum multiplied by a respective weighted variable.

16. The method according to claim 1, wherein the article comprises a reflective article.

17. The method according to claim 16, wherein the reflective article comprises a sheet metal part.

\* \* \* \* \*